(12) United States Patent
Loethen

(10) Patent No.: US 11,297,979 B2
(45) Date of Patent: Apr. 12, 2022

(54) CHARCOAL CHIMNEY

(71) Applicant: Bruce Loethen, Leander, TX (US)

(72) Inventor: Bruce Loethen, Leander, TX (US)

( * ) Notice: Subject to any disclaimer, the term of this patent is extended or adjusted under 35 U.S.C. 154(b) by 246 days.

(21) Appl. No.: 16/669,214

(22) Filed: Oct. 30, 2019

(65) Prior Publication Data
US 2020/0129008 A1    Apr. 30, 2020

Related U.S. Application Data

(60) Provisional application No. 62/753,407, filed on Oct. 31, 2018.

(51) Int. Cl.
    A47J 37/07    (2006.01)
(52) U.S. Cl.
    CPC .................. A47J 37/079 (2013.01)
(58) Field of Classification Search
    CPC ........................................... A47J 37/079
    See application file for complete search history.

(56) References Cited

U.S. PATENT DOCUMENTS

| | | | | |
|---|---|---|---|---|
| 3,139,880 | A * | 7/1964 | Sangeorge | A47J 37/079 126/25 C |
| 3,307,506 | A * | 3/1967 | Rose | A47J 37/079 126/25 B |
| 3,382,863 | A * | 5/1968 | Katz | A47J 37/0786 126/242 |
| 3,765,397 | A | 10/1973 | Henderson | |
| 3,848,577 | A | 11/1974 | Storandt | |
| 3,934,520 | A | 1/1976 | Brennan et al. | |
| 3,974,821 | A * | 8/1976 | Storandt | A47J 37/079 126/25 B |
| 4,094,649 | A * | 6/1978 | Osterried | C10L 11/00 126/25 B |
| 4,215,667 | A * | 8/1980 | Hsu | A47J 37/0763 126/25 AA |

(Continued)

OTHER PUBLICATIONS

Charlie, How To Use A Charcoal Chimney Starter (Foolproof Guide), Simply Meat Smoking, Oct. 2019, [online], [retrieved on Sep. 10, 2018], Retrieved from the Internet <https://www.simplymeatsmoking.com/charcoal-smoker/how-to-use-charcoal-chimney-starter/>.

*Primary Examiner* — Avinash A Savani
*Assistant Examiner* — Deepak A Deean
(74) *Attorney, Agent, or Firm* — Craige Thompson; Thompson Patent Law; Timothy D. Snowden

(57) ABSTRACT

Apparatus and associated methods relate to a charcoal chimney with a conical shaped charcoal grate, a removable upper canister (e.g., a cylindrical upper canister) placed on the charcoal grate and a lower canister (e.g., a cylindrical lower canister) placed below the charcoal grate. In an illustrative example, the lower canister may be permanently mounted to the charcoal grate. In various embodiments, the lower canister may be permanently mounted to a grill, or a smoker body itself. In some embodiments, the charcoal chimney may have a detachable handle which may remove the upper canister as needed. Various embodiments may advantageously reduce handling, or eliminate picking up high temperature burning solid fuels, which may prevent the hot solid fuels from falling and creating a risk of injury, or fire damage to adjacent structures (e.g., wooden decks).

20 Claims, 16 Drawing Sheets

(56) References Cited

U.S. PATENT DOCUMENTS

| | | | | |
|---|---|---|---|---|
| 4,227,510 A | * | 10/1980 | Frazier | F24B 15/005 126/25 B |
| 4,417,565 A | * | 11/1983 | Karpinia | F23Q 13/04 126/25 B |
| 4,510,916 A | * | 4/1985 | Ogden | A47J 37/079 126/25 B |
| 4,567,876 A | | 2/1986 | Ogden | |
| 4,603,679 A | | 8/1986 | Ogden | |
| 5,154,159 A | * | 10/1992 | Knafelc | A47J 37/0704 126/154 |
| 5,197,455 A | * | 3/1993 | Tessien | A47J 37/079 126/144 |
| 5,425,352 A | | 6/1995 | Gillam et al. | |
| 5,469,835 A | | 11/1995 | Stephen et al. | |
| 6,009,867 A | * | 1/2000 | Walton | A47J 37/079 126/25 B |
| 6,827,076 B2 | * | 12/2004 | Crawford | A47J 37/0731 126/25 R |
| 6,913,013 B1 | * | 7/2005 | Mize | A47J 37/079 126/25 B |
| 8,627,550 B1 | | 1/2014 | Chung | |
| 10,653,273 B2 | * | 5/2020 | Lantz | A47J 37/079 |
| 2005/0045168 A1 | * | 3/2005 | Zapp | A47J 37/079 126/25 B |
| 2007/0044784 A1 | * | 3/2007 | Thompson | F23Q 7/16 126/25 B |
| 2008/0230043 A1 | | 9/2008 | Bruno | |
| 2009/0277438 A1 | * | 11/2009 | Fischer | C10L 5/368 126/25 B |
| 2015/0144121 A1 | | 5/2015 | Swatling et al. | |
| 2017/0156546 A1 | * | 6/2017 | Lantz | A47J 37/0763 |
| 2018/0153345 A1 | | 6/2018 | Rasmussen | |

* cited by examiner

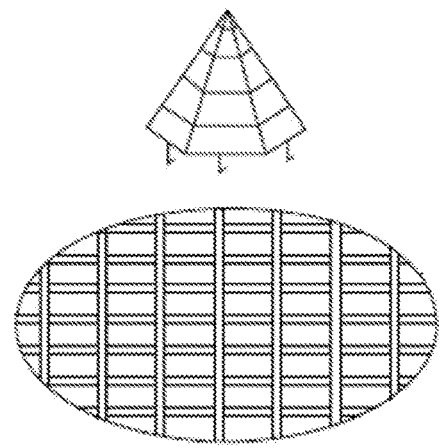
FIG. 3D
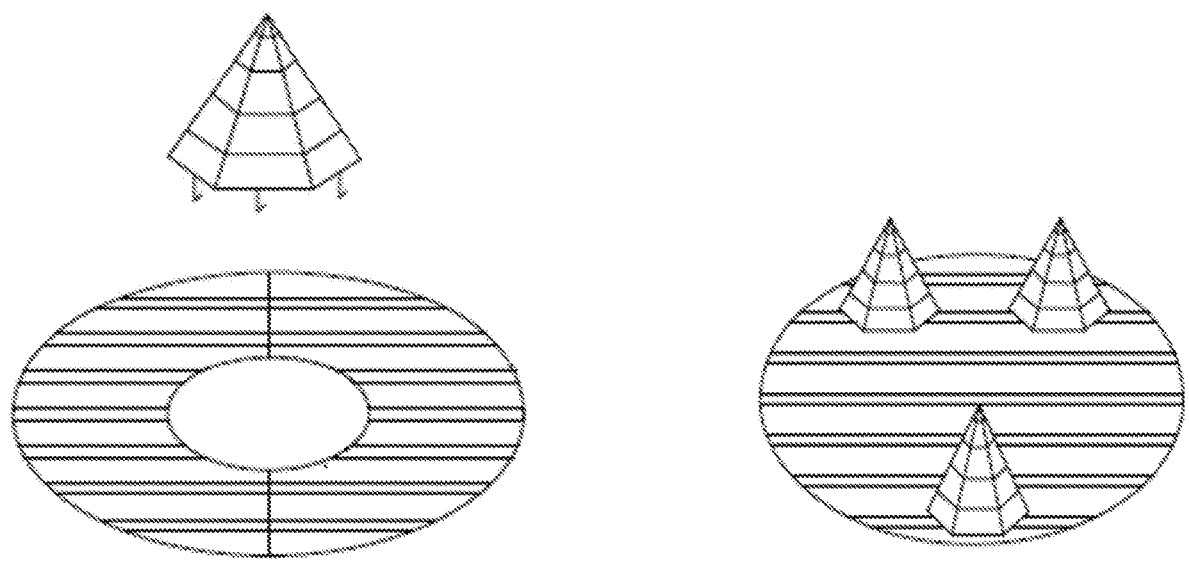
FIG. 3E
FIG. 3F

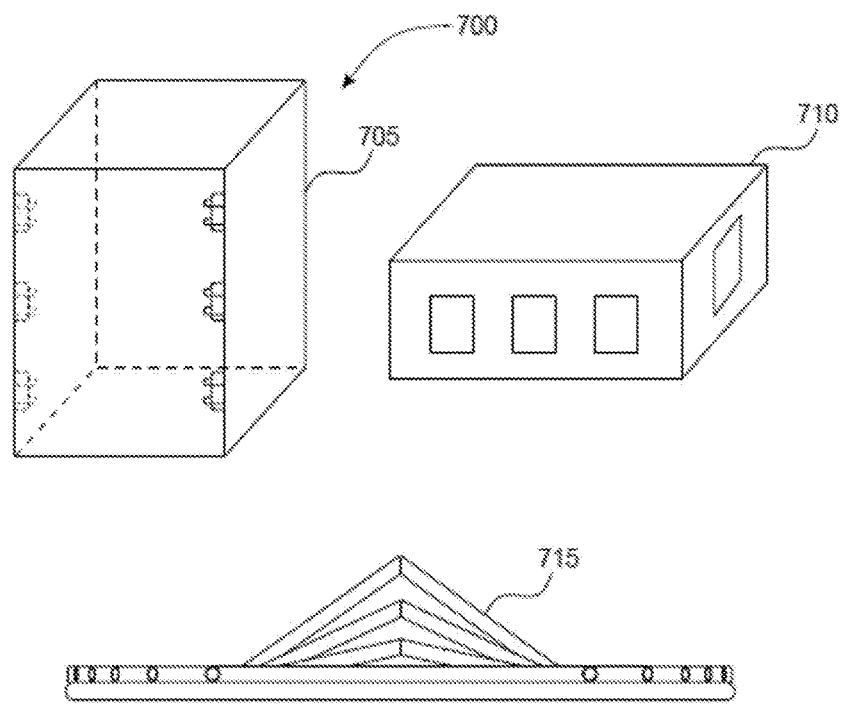
FIG. 7A
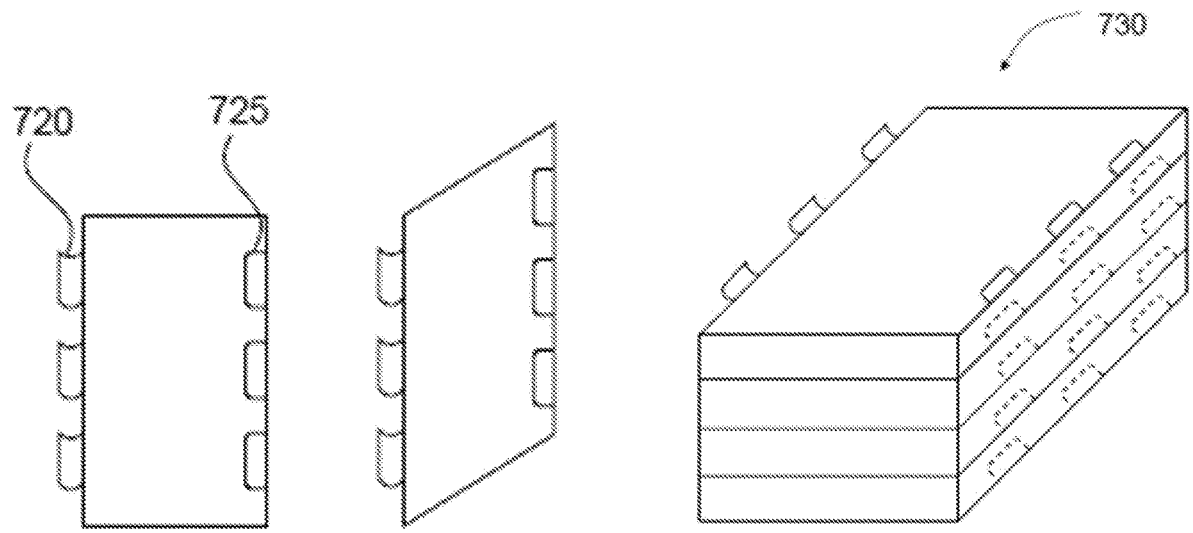
FIG. 7B
FIG. 7C

CHARCOAL CHIMNEY

CROSS-REFERENCE TO RELATED APPLICATIONS

This application claims the benefit of U.S. Provisional Application Ser. No. 62/753,407, titled "Charcoal Chimney," filed by Bruce Loethen, on Oct. 31, 2018.

This application incorporates the entire contents of the foregoing application(s) herein by reference.

TECHNICAL FIELD

Various embodiments generally relate to a charcoal chimney.

BACKGROUND

Fire is a chemical reaction that requires a proper mix of oxygen, heat, and fuel. An exothermic release of heat can cause the fire to ignite nearby fuels.

Cooking devices can employ heat produced by a fuel source that is combusting below a cooking surface. Various cooking devices that employ combustible fuels include gas stoves, charcoal smokers, and charcoal grills, for example. In a charcoal grill, a fuel source, such as charcoal, may be heated in a metal canister until the charcoal has achieved sufficient temperature to cook food. During cooking, the charcoal may be supported on a charcoal grate located below a cooking surface.

SUMMARY

Apparatus and associated methods relate to a charcoal chimney with a conical shaped charcoal grate, a removable upper canister (e.g., a cylindrical upper canister) placed on the charcoal grate and a lower canister (e.g., a cylindrical lower canister) placed below the charcoal grate. In an illustrative example, the lower canister may be permanently mounted to the charcoal grate. In various embodiments, the lower canister may be permanently mounted to a grill, or a smoker body itself. In some embodiments, the charcoal chimney may have a detachable handle which may remove the upper canister as needed. Various embodiments may advantageously reduce handling, or eliminate picking up high temperature burning solid fuels, which may prevent the hot solid fuels from falling and creating a risk of injury, or fire damage to adjacent structures (e.g., wooden decks).

Various embodiments may achieve one or more advantages. For example, some embodiments may allow a user to retrofit an existing grill, or an existing smoker, with a removable and reusable grate. In various embodiments, the conical shapes grate may include a flat portion and a conical portion detachable coupled to the flat portion. The conical portion may be removable to allow placement of the burner. In various embodiments, a non-planar, inverted cavity design may promote faster heating of the charcoal by improving the contact between the charcoal, airflow, and flame, from a burner in the lower canister. In some embodiments, the upper canister with a substantially smooth inner surface that may advantageously avoid catching hot charcoal and generating airborne hot charcoal debris. In some implementations, the charcoal chimney may be designed to allow a user to employ an existing detachable handle to remove the upper canister. No gloves may be needed when holding the handle nor a fixed heat shield is needed on the handle. In some examples, both the upper canister and the lower canister may be folded up for easy storage and transport. In some embodiments, the lower canister with a door may advantageously make adding additional burners simpler before and after igniting.

The details of various embodiments are set forth in the accompanying drawings and the description below. Other features and advantages will be apparent from the description and drawings, and from the claims.

BRIEF DESCRIPTION OF THE DRAWINGS

FIGS. 3A-3F depict exemplary variants of a charcoal grate implemented in the charcoal chimney.

FIGS. 7A-7C depict an exemplary foldable charcoal chimney.

Like reference symbols in the various drawings indicate like elements.

DETAILED DESCRIPTION OF ILLUSTRATIVE EMBODIMENTS

Figure 1A:
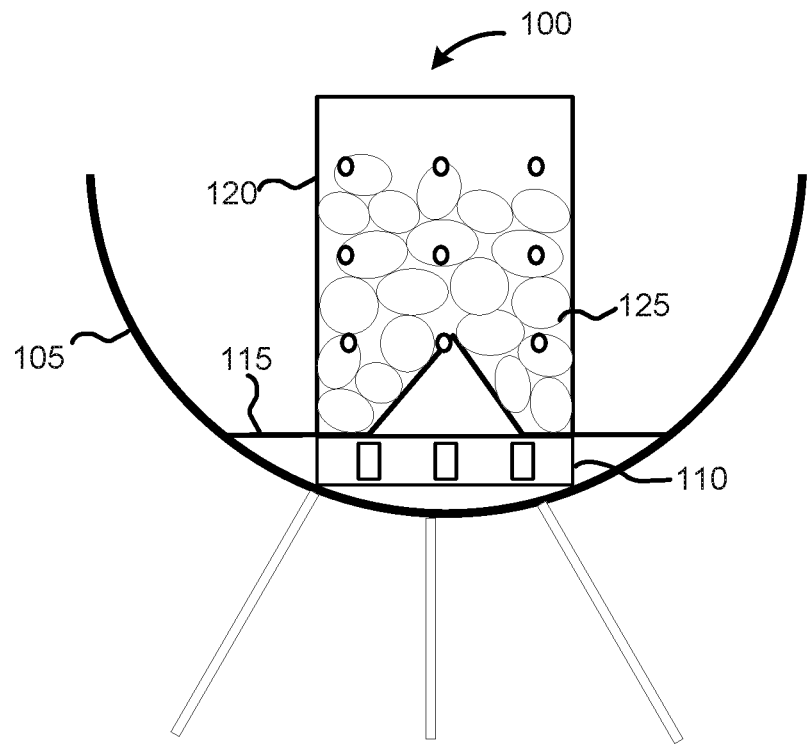
FIGS. 1A-1D depict an exemplary charcoal chimney employed in an illustrative grill.

FIGS. 1A-1D depict an exemplary charcoal chimney employed in an illustrative grill. As FIG. 1A shows, in this illustrated example, a charcoal chimney 100 is disclosed. The charcoal chimney 100 includes a lower canister 110. The lower canister 110 is placed below a charcoal grate 115. A removable upper canister 120 is placed on the charcoal grate 115.

In this depicted example, the charcoal chimney 100 is employed in a grill 105 and placed on the bottom of the grill 105. In some embodiments, the charcoal chimney 100 may be employed in a smoker and placed on the bottom of the smoker. The charcoal chimney 100 may be used for all other kinds of cooking devices when charcoal is used as fuel. The lower canister 110 may be designed to hold newspapers, pulp cubes, or paraffin cube burners, for example. In this depicted example, a series of air intake openings 130 are disposed around and through the periphery of the lower canister 110. The openings may be rectangular as shown, or any other conveniently fabricated shape.

The charcoal grate 115 includes a conical shaped charcoal portion. The charcoal grate 115 is placed on the lower canister 110 and is designed to provide faster heating of charcoal by improving the contact between charcoal, the airflow, and flame from a burner in the lower canister 110. In some embodiments, the charcoal grate 115 may be placed directly on the grill 105, and the lower canister 110 may be omitted, and newspapers, pulp cubes, or paraffin cube burners fuels may be held by the grill 105. In some embodiments, the conical shaped charcoal grate 115 may be removable from the lower canister 110.

Solid fuels 125 (e.g., charcoal, wood chips, briquettes) may be placed in the upper canister 120 and may be held by the charcoal grate 115. After newspapers, pulp cubes, or paraffin cube burner in the lower canister 110 are lit and charcoal arrives at a sufficient temperature to cook food, the upper canister 120 is lifted slowly by gripping with a handle 128. In some embodiments, the handle 128 may be removable. Examples of the upper canister which could be lifted by a detachable handle are described in further detail with reference to FIG. 5. In this depicted example, the upper canister 120 and the lower canister 110 each have a tubular cylindrical shape. In this depicted example, the upper canister 120 and the lower canister 110 have the same diameter. In various embodiments, the upper canister 120 may have a larger diameter than the lower canister 110 which may enable the lower canister 110 to be placed inside the upper canister 120 for compact storage. In various embodiments, the upper canister 120 may have a smooth and feature-free inner wall surface that tends to release all hot charcoal and hot debris as it slides upward to be removed for cooking.

Figure 1B:
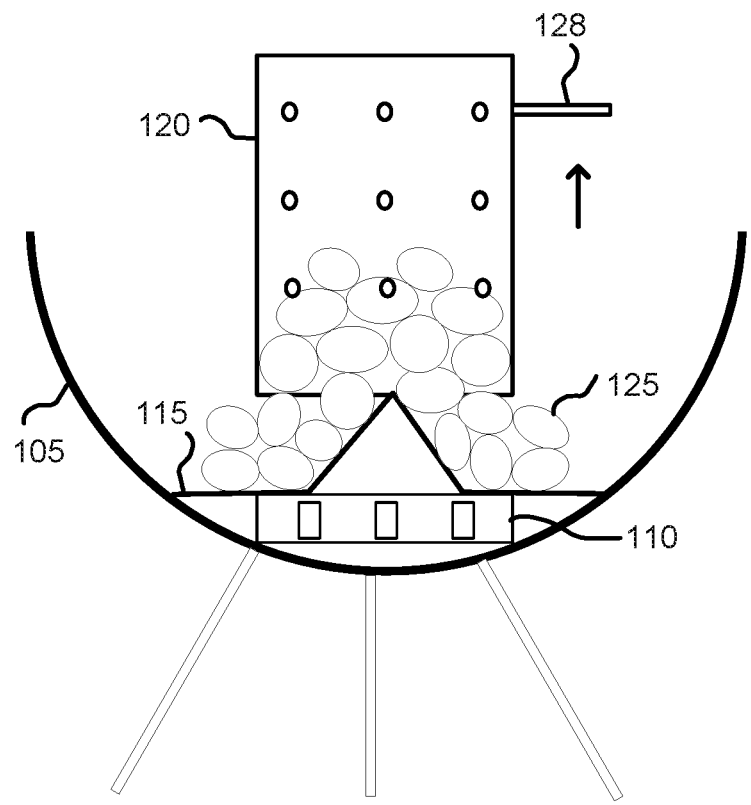
Figure 1C:
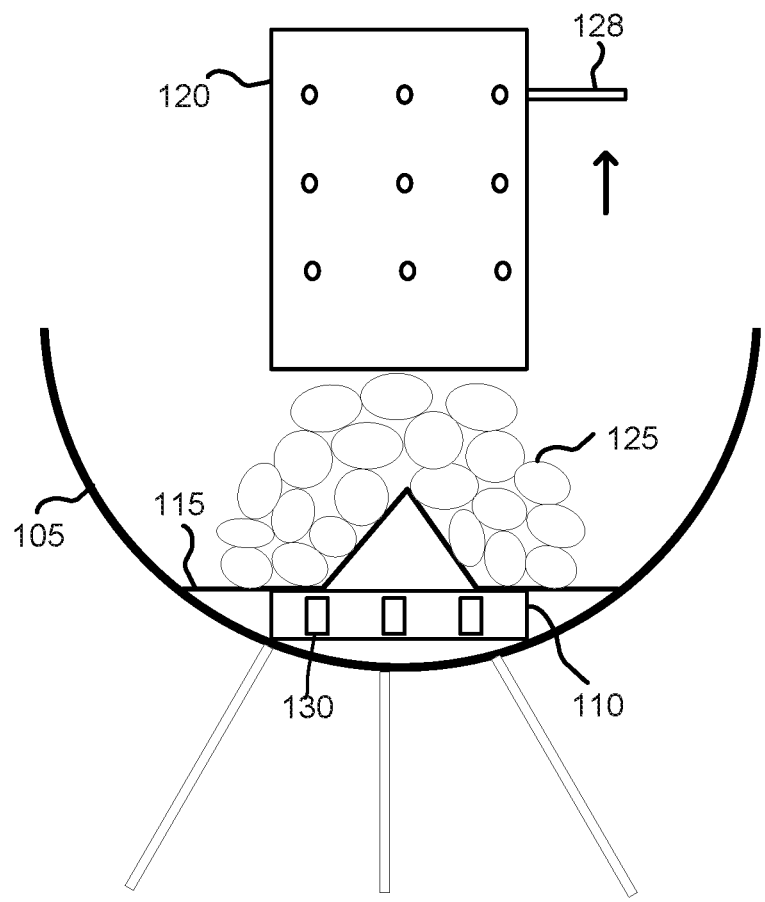
Figure 1D:
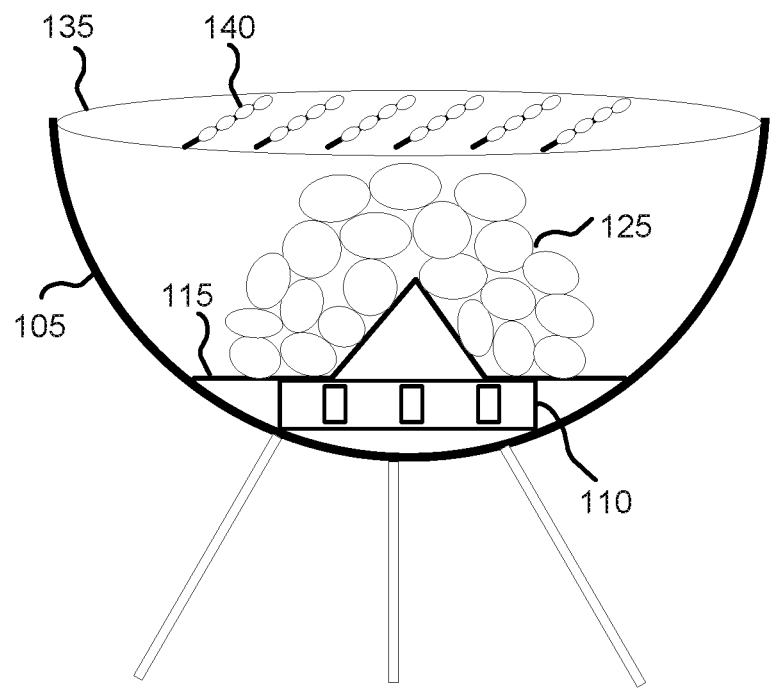

Solid fuels 125 fall slowly as the upper canister 120 is removed slowly, as shown in FIG. 1B. The solid fuels 125 are supported by the charcoal grate 115 after the upper canister 120 is fully removed, as shown in FIG. 1C. By using this removable upper canister 120, a user may transfer the burning solid fuels 125 (e.g., charcoal) from the upper canister 120 to the charcoal grate 115 without holding the handle 128 for a long time (e.g., more than 5 seconds) or lifting the charcoal chimney 100 to dump out the hot charcoal 125. The upper canister 120 keeps charcoal piled and localized. After the upper canister is removed slowly, charcoal may not spread everywhere on the grate. Gaps may be maintained between charcoal and edge of the grate. Those gaps may allow better air circulation and may keep charcoal combusting and sustaining a high temperature. The user may also hold the upper canister 120 and move it around to distribute the charcoal evenly on the charcoal grate 115 to provide an even temperature profile. After the upper canister 120 is removed, a grill grate 135 is placed on the grill 105 to hold food 140 to be heated by the burning solid fuels 125.

Figure 2A:
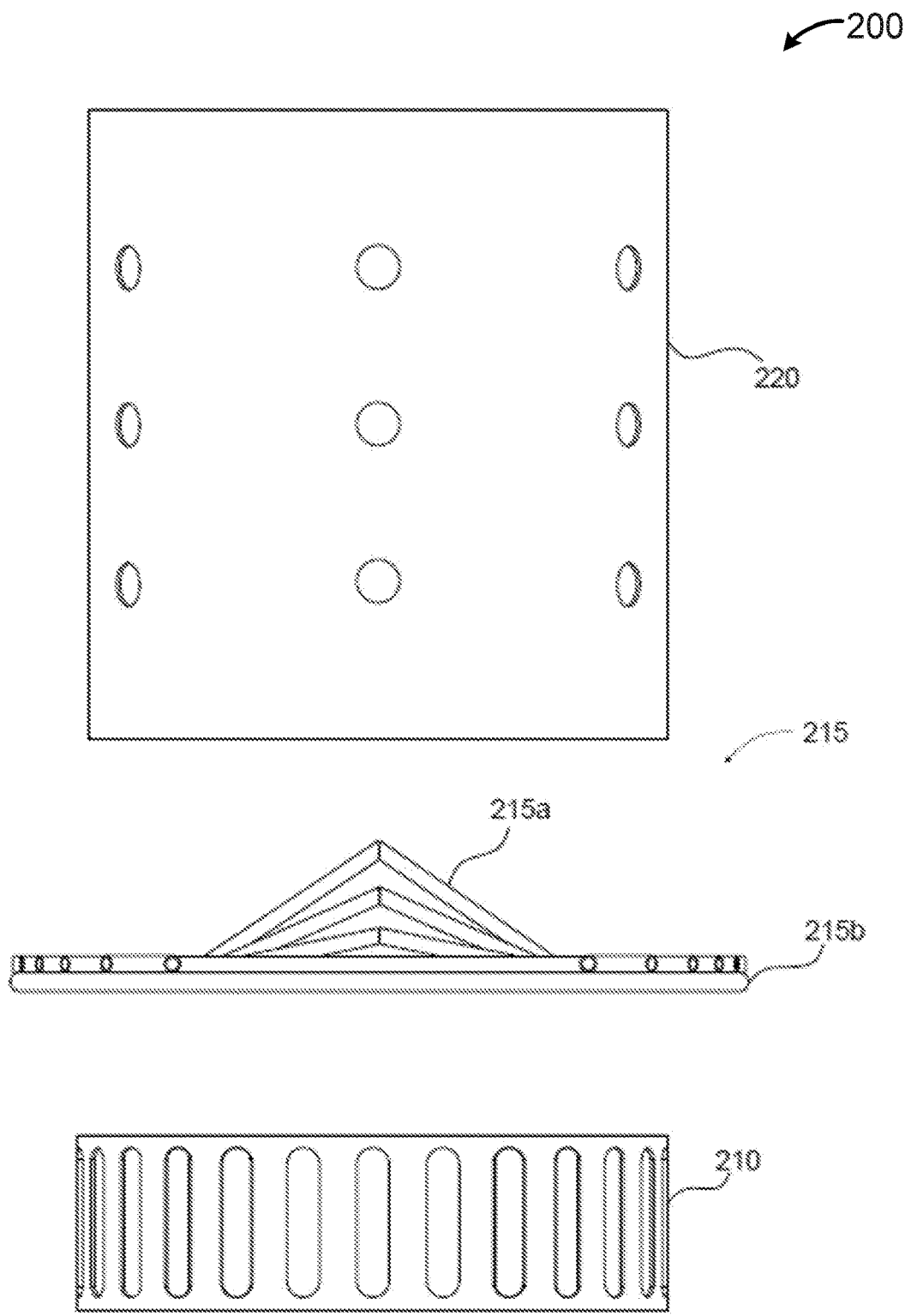
FIG. 2A depicts an exemplary exploded view of the charcoal chimney.

FIG. 2A depicts an exemplary exploded view of the charcoal chimney. A charcoal chimney 200 includes the lower canister 210, the charcoal grate 215 and the removable upper canister 220. In this depicted example, the conical shaped charcoal grate 215 is removable from the lower canister 210. In some embodiments, the charcoal grate 215 may be welded with the lower canister 210 to provide a rigid support for charcoal. In this depicted example, the upper canister 220 has a series of holes located around and through the periphery of the upper canister 220.

In this depicted example, the charcoal grate 215 is a one-piece shaped grate like a witch's hat. The conical shaped charcoal grate 215 includes a cone portion 215a. This cone portion 215a provides an inverted cavity which may increase the contact surface among the charcoal, the air flow, and flames. The charcoal grate 215 also includes a flat portion 215b. The flat portion 215b extends outward from the cone portion 215a to hold all charcoal after the upper canister 220 is removed. In this depicted example, the cone portion 215a has a smaller diameter than the upper canister 220, and the lower canister 210 and the upper canister 220 have the same diameter. In some embodiments, the lower canister 210 may have a different diameter from the upper canister 220. Other variants of the grate 215 are discussed in detail with reference to FIGS. 3A-3E.

Figure 2B:
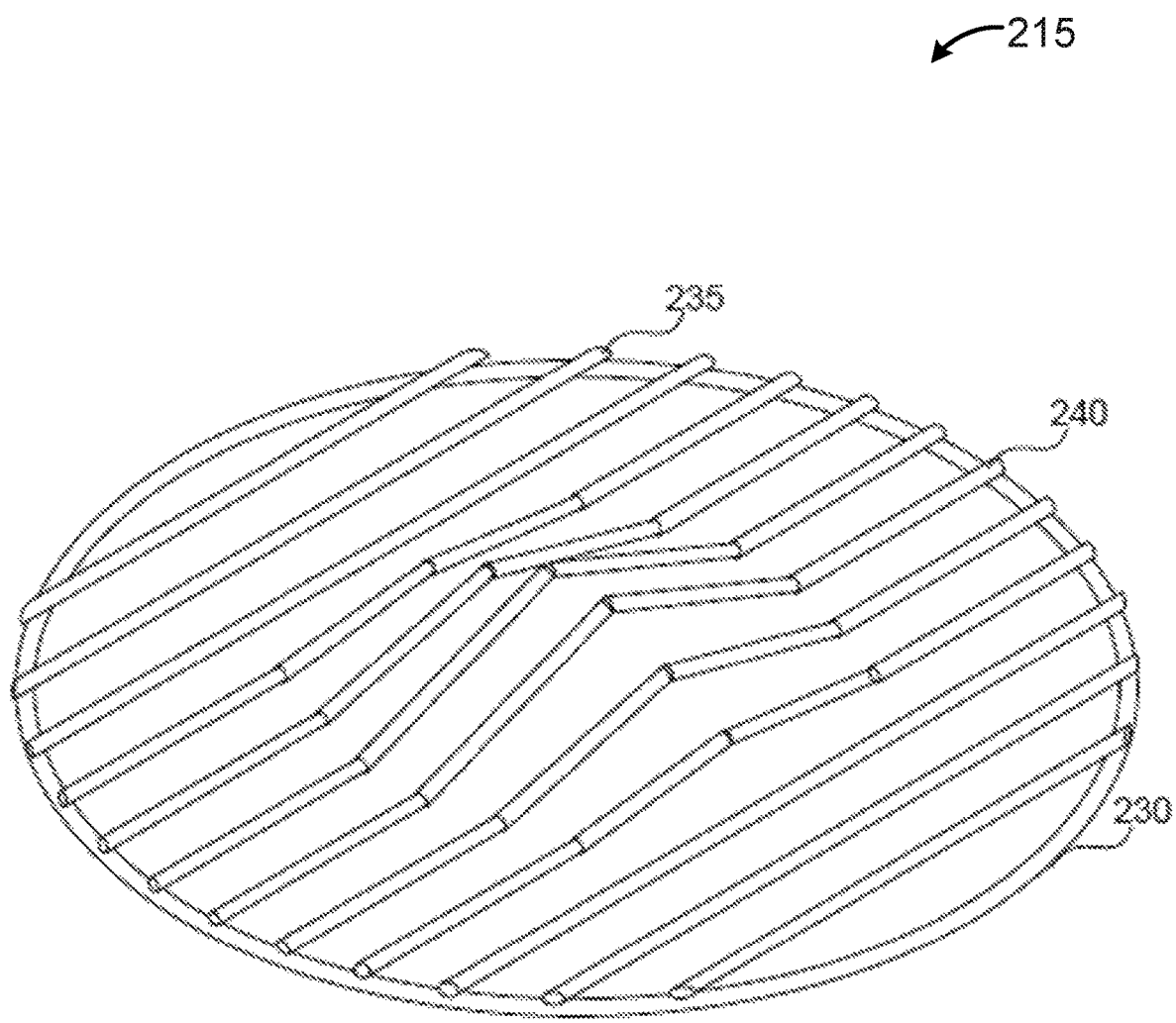
FIG. 2B depicts a perspective view of an exemplary grate implemented in the charcoal chimney with reference to FIG. 2A.

FIG. 2B depicts a perspective view of an exemplary grate implemented in the charcoal chimney with reference to FIG. 2A. In this depicted example, the grate 215 may be formed by welding a number of metallic wires. The number of metallic wires includes a circular metallic wire (e.g., circular metallic wire 230), a number of straight metallic wires (e.g., straight wire 235) and a number of metallic wires (e.g., wire 240) that have a corresponding convexity in the middle. The respective degree of a corresponding convexity of each metallic wires may be different. For example, the slopes between the different convexities and the horizontal plane may be ranged from 0 to 60 degrees.

Figure 3A:
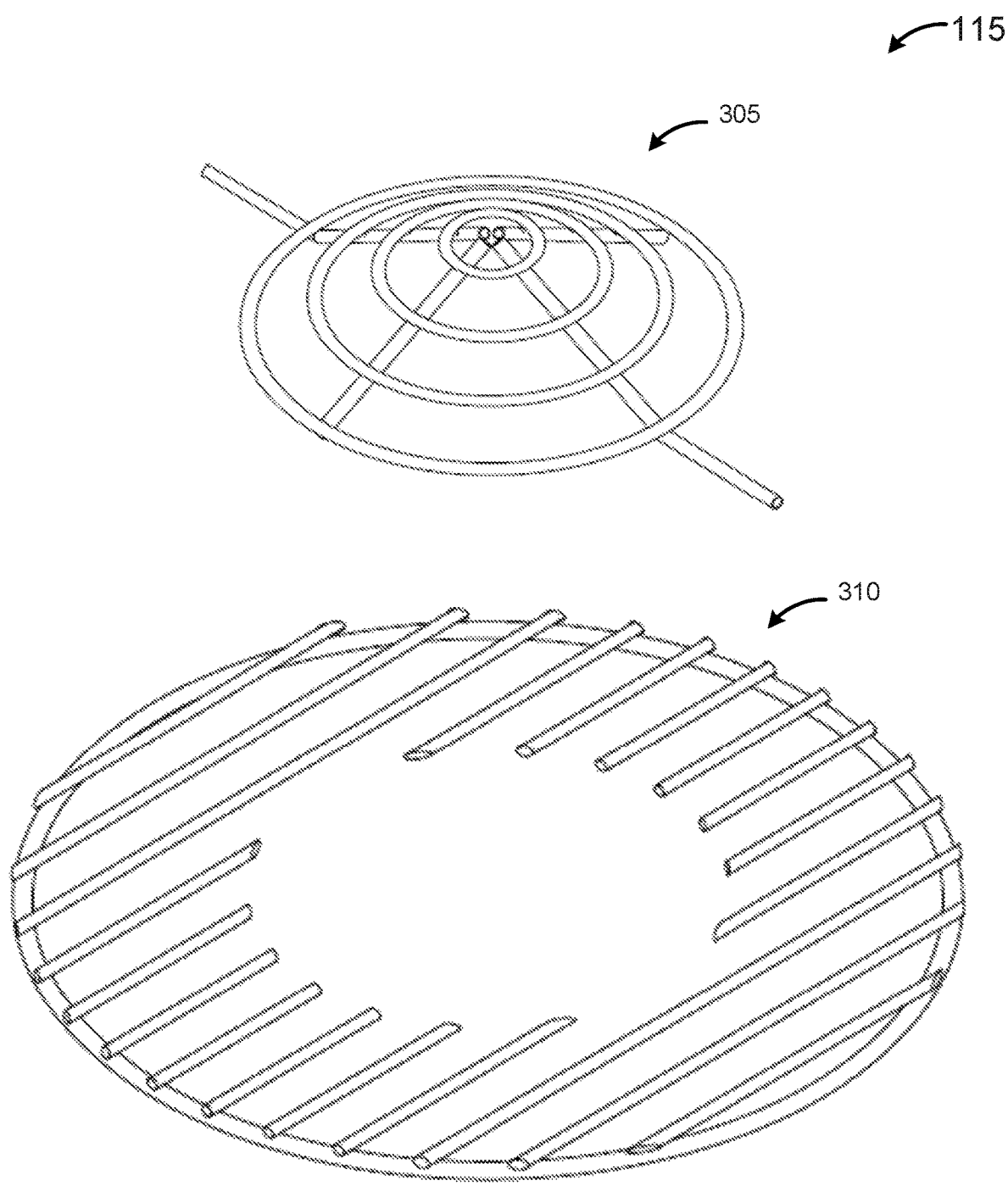
Figure 3B:
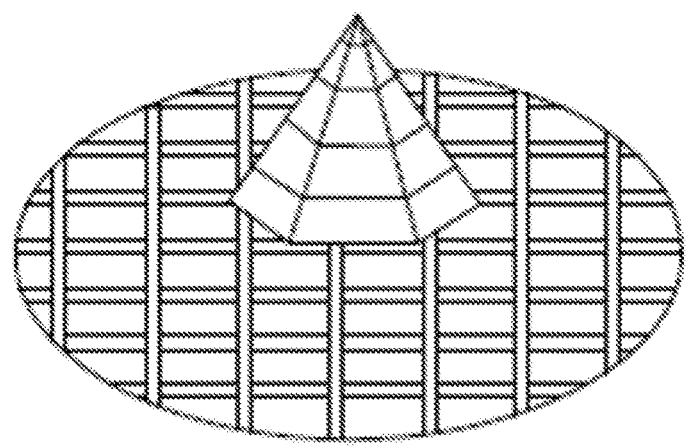
Figure 3C:
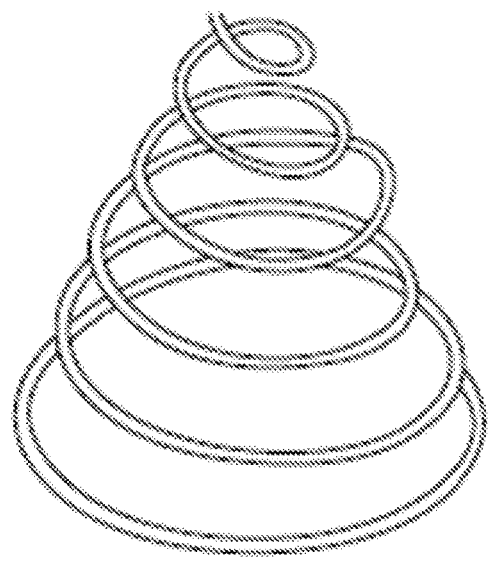

FIGS. 3A-3F depict exemplary variants of a charcoal grate implemented in the charcoal chimney. As shown in FIG. 3A, the charcoal grate 115 may be formed by two parts. The first part is a cone-shaped grate 305 and the second part is a disk-shaped grate 310. The cone-shaped grate 305 may be detachably attached to the disk-shaped grate 310 to form the grate 115. In various embodiments, the cone-shaped grate portion may be removable to allow placement of the burner. The size of the cone-shaped grate may be designed to make the cone-shaped grate match the size of the inner size of the disk-shaped grate. The charcoal grate 115 may also have other variants as shown in FIGS. 3B-3F. For example, the cone-shaped grate may be attached to the disk-shaped grate 310 by small hooks. By way of example, different embodiments of charcoal grate is described, with reference to FIGS. 3A-3E of the U.S. Provisional Application Ser. No. 62/753,407, titled "Charcoal Chimney" and filed by Bruce Loethen on Oct. 31, 2018, the entire content of which is incorporated here.

Figure 4A:
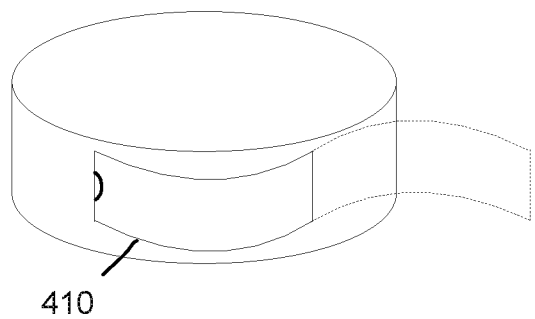
FIG. 4A depicts an exemplary variant of a lower canister of the charcoal chimney.
Figure 4B:
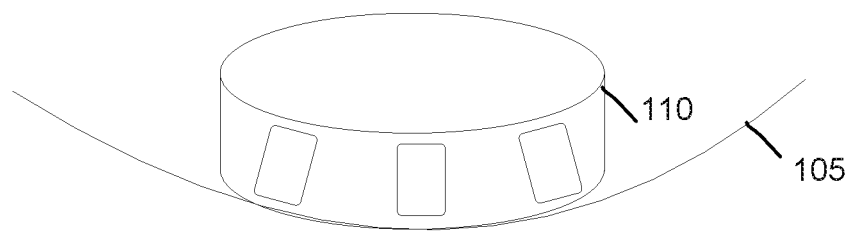
FIG. 4B depicts an exemplary lower canister mounted with a grill.

FIG. 4A depicts an exemplary variant of a lower canister of the charcoal chimney. As shown in FIG. 4B, instead of a series of openings on the surface of the lower canister (e.g., the lower canister 110 in FIG. 1), a door 410 is designed for the lower canister. Larger burners may be placed into the lower canister through the door. The door 410 may also be opened to add more newspaper, or cube fuel resources within the lower canister as needed. The door may be controlled to open or close to adjust the supply of air flow into the lower canister.

FIG. 4B depicts an exemplary lower canister mounted with a grill. As shown in FIG. 4B, a lower canister (e.g., the lower canister 110 of FIG. 1) is permanently mounted with a grill (e.g., the grill 105 of FIG. 1). For example, the lower canister and the grill may be welded together.

Figure 4C:
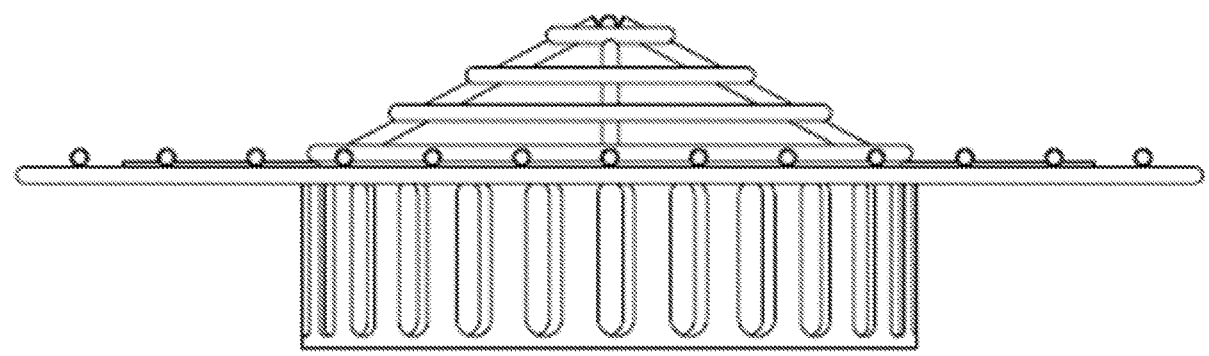
FIG. 4C depicts an exemplary variant of a charcoal grate mounted with an exemplary lower canister.

FIG. 4C depicts an exemplary variant of a charcoal grate mounted with an exemplary lower canister. As shown in FIG. 4C, a lower canister (e.g., the lower canister 110 in FIG. 1) is permanently mounted with a charcoal grate (e.g., the charcoal grate 115 in FIG. 1). For example, the lower canister and the grate may be welded together or may be connected together with an attachment ring.

Figure 5:
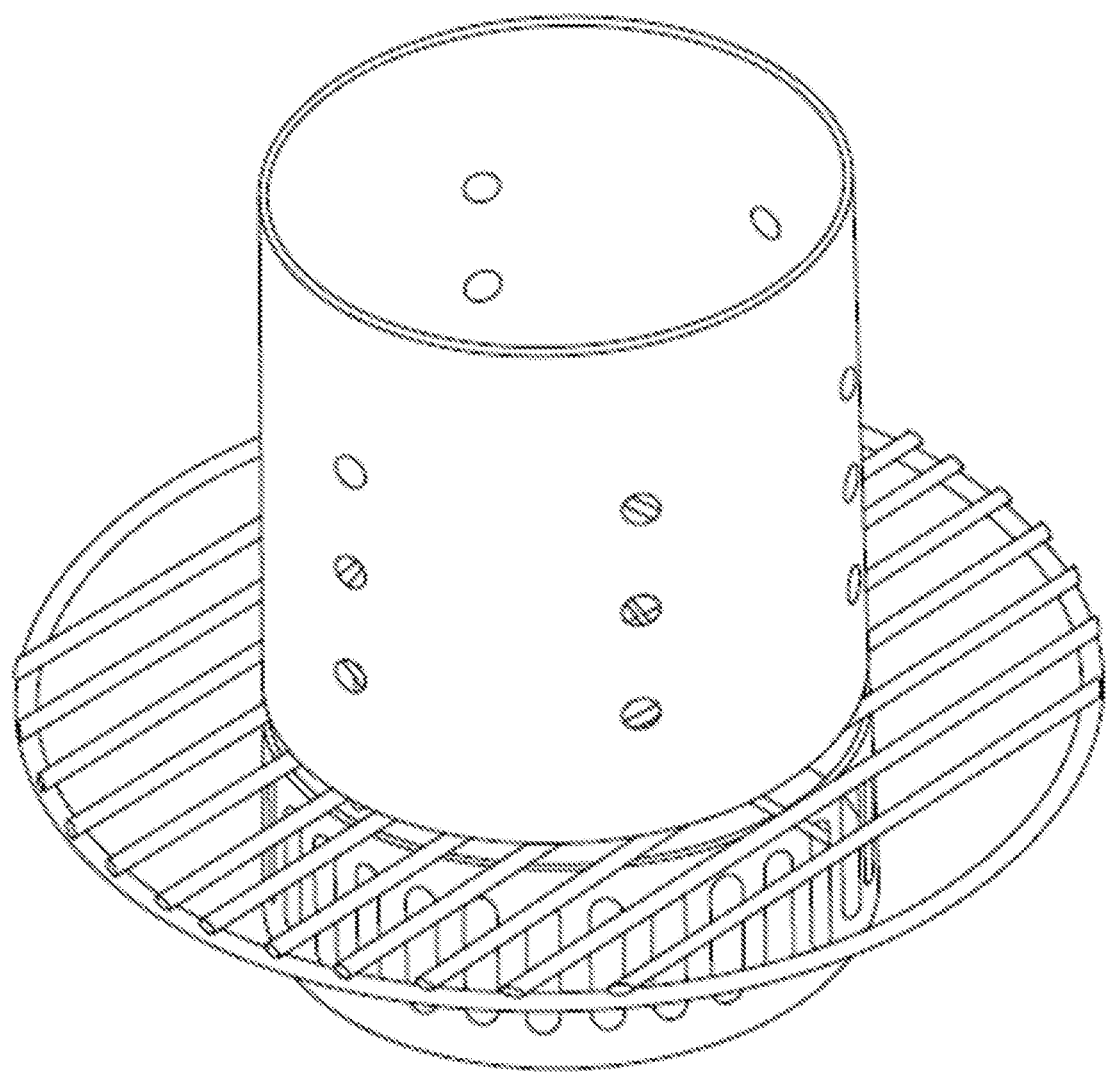
FIG. 5 depicts a perspective view of an exemplary charcoal chimney.
Figure 6A:
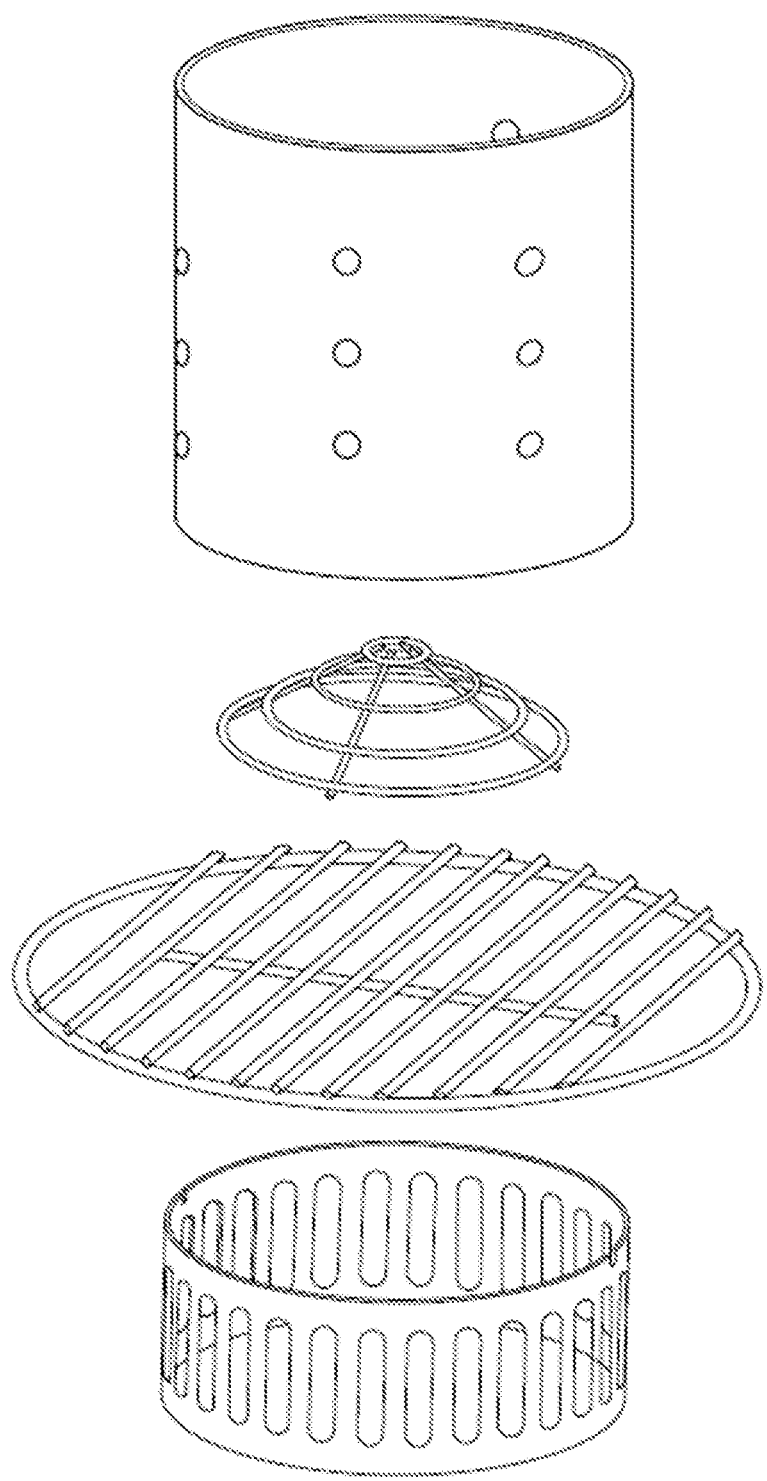
FIGS. 6A-6B depict exemplary exploded view of the charcoal chimney with reference to FIG. 5.

FIG. 5 depicts a perspective view of an exemplary charcoal chimney. FIG. 6A depicts an exemplary exploded view of the charcoal chimney with reference to FIG. 5. In this depicted example, the charcoal grate is formed by two separate parts. The cone part may be directly placed on the flat part. In some embodiments, the cone part may be connected to the flat part through, for example, small hooks.

Figure 6B:
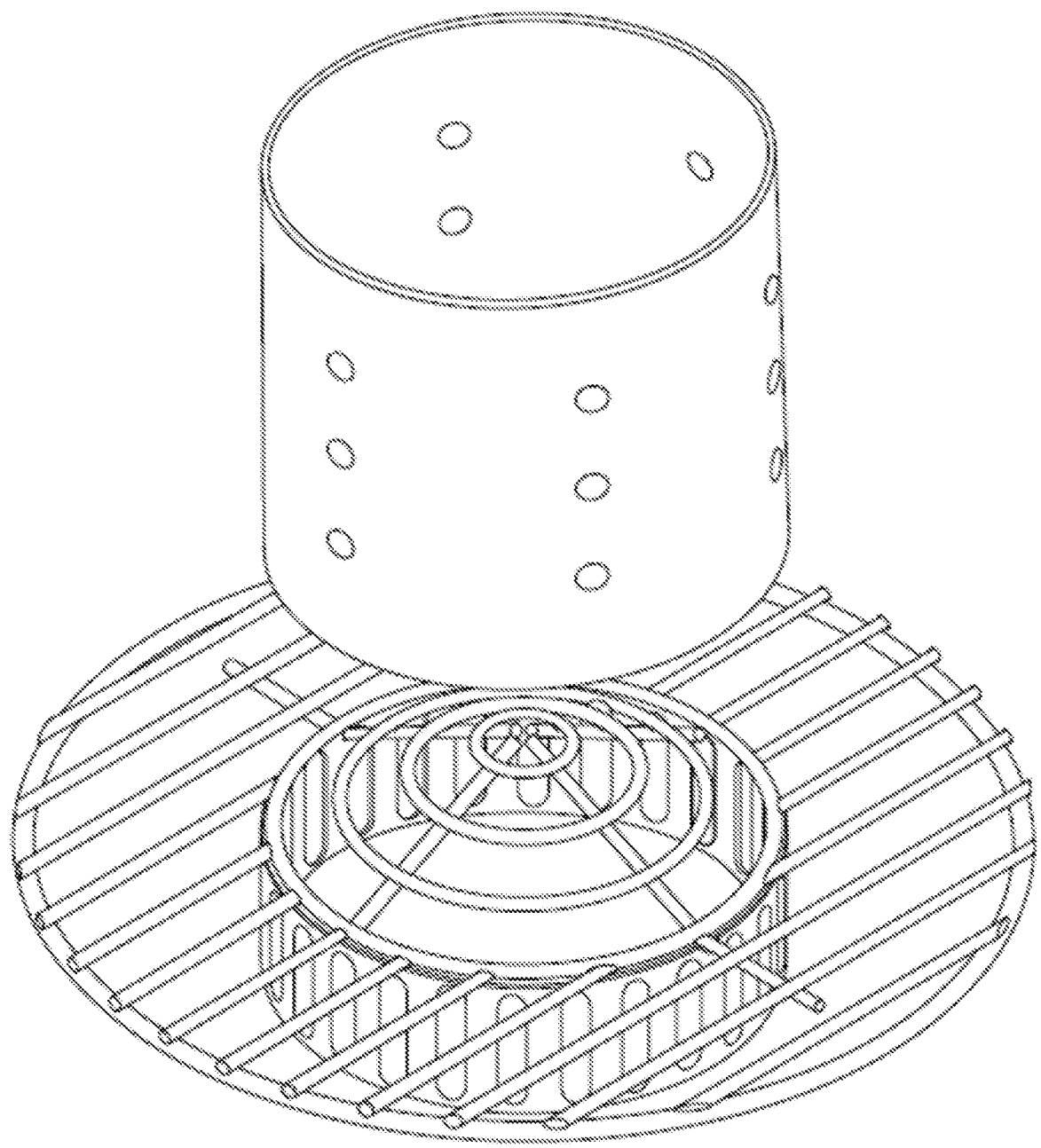

FIG. 6B depict another exemplary exploded view of the charcoal chimney with reference to FIG. 5. In this depicted example, the charcoal grate is a one-piece grate. The cone part is permanently connected to the flat part.

FIGS. 7A-7C depict an exemplary foldable charcoal chimney. As shown in FIG. 7A, a charcoal chimney 700 includes an upper canister 705, a lower canister 710 and a conical charcoal grate 715 placed between the upper canister 705 and the lower canister 710. The upper canister 705 and the lower canister 710 are cuboid tubular shaped structure. In some embodiments, a top view of the conical shaped charcoal grate 715 may have a shape that may be easily manufactured, e.g., a circular shape, a rectangular shape or a square shape. FIG. 7B depicts an exemplary mechanism to achieve the foldable charcoal chimney. The upper canister 705 includes four independent metal pieces. Each metal piece includes several rectangular openings 725 on one of its long edges. Each metal piece also includes the corresponding number of rectangular hooks 720 designed to match the openings 725. The four metal pieces may be connected to form the upper canister 705. The same mechanism may be used to form a foldable lower canister 710. FIG. 7C shows one example of the folded upper canister 730. The folded upper canister 730 may be easy to store and transport compared to the deployed upper canister 705. In some embodiments, a top view of the charcoal grate 715 may have a shape that may be easily manufactured, e.g., a circular shape, a rectangular shape or a square shape.

Figure 8A:
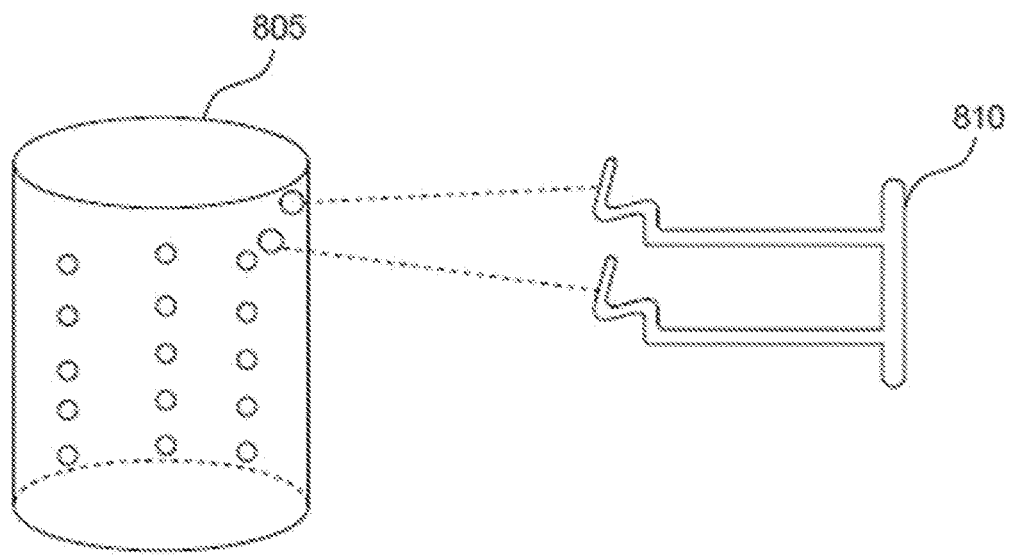
FIGS. 8A-8B depict exemplary variants of upper canisters that can be removed with detachable handles.
Figure 8B:
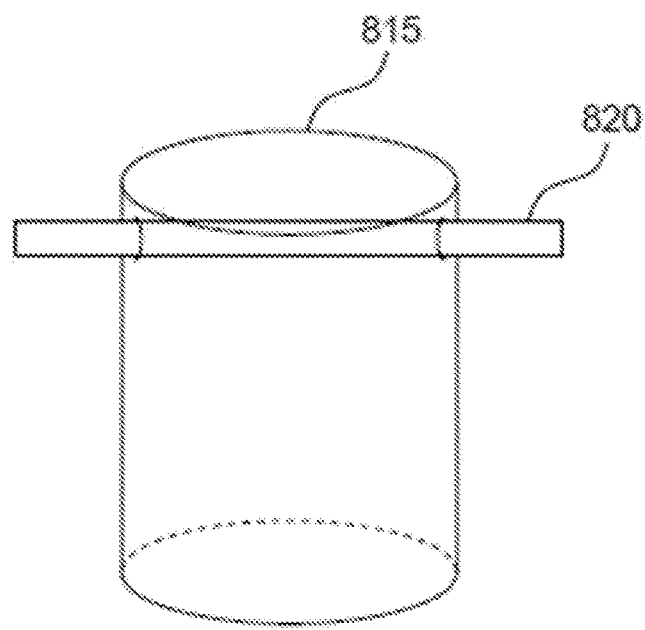

FIGS. 8A-8B depict exemplary variants of upper canisters that can be removed with detachable handles. FIGS. 8A-8B depict exemplary variants of upper canisters of the charcoal chimney. When a charcoal chimney is manufactured with an attached handle, the handle would have a high temperature as the charcoal is burning inside the upper canister 120. As disclosed in FIG. 1, the upper canister 120 is removable from the charcoal grate 115. The upper canister 120 may be designed without a handle which makes the manufacture less costly and less complex. A user may incorporate their own handles to lift the upper canister 120, and the handle only needs to bear a small momentum to lift the upper canister. As shown in FIG. 8A, a series of holes are designed on the upper canister 805. The holes are configurable with various handles. In this depicted example, two holes are designed on an upper canister 805. A detachable handle 810 is used to lift or remove the upper canister 805. As shown in FIG. 8B, a more cost-effective example is discussed. An upper canister 815 includes at least two opposing holes placed in on the upper canister. The user may not need to buy a professional detachable handle. A wooden stick, a piece of hard metal, or a branch, for example, may be used to pass through the two holes and used as a handle 820 to lift the upper canister 815.

Although various embodiments have been described with reference to the figures, other embodiments are possible. For example, the lower canister and the grate may be made by reusable materials (e.g., metals), while the upper canister may be made of some consumable material, for example, cardboard. The cardboard may be placed on the grate and contain original charcoal at first. As charcoal are ignited, and temperatures get high, the cardboard may be consumed from bottom to top and charcoal may fall gradually. In this depicted example, a handle may be no longer needed to remove the upper canister.

In one exemplary aspect, an ignition assembly includes a lower canister comprising a first wall extending longitudinally along a first longitudinal axis and between a first end and a second end to define a first chamber, an upper canister comprising a second wall extending longitudinally along a second longitudinal axis and between a third end and a fourth end to define a second chamber, wherein when the third end releasably engages the second end, the first longitudinal axis is parallel to the second longitudinal axis, and, a grate, supported by the first wall in a plane orthogonal to the first longitudinal axis, configured to support a quantity of charcoal that is supplied into the second chamber via the fourth end. The upper canister is configured to be removed from the lower canister such that, upon said removal, the charcoal supplied into the second chamber remains substantially supported by the grate.

In some embodiments, the ignition assembly may also include a handle releasably coupled to the upper canister. In some embodiments, the ignition assembly may also include an inclined grate member configured to be supported by the grate to support at least a portion of the quantity of charcoal, the inclined grate member defining a plurality of support members extending out of the plane of the grate in an upward direction toward the second chamber so as to support thereon, at an elevation above the plane of the grate, charcoal that may be supplied into the second chamber via the fourth end.

In some embodiments, the inclined grate member may be integrally formed with the grate as a unitary body. In some embodiments, the inclined grate member may be formed with a conical shape. In some embodiments, the grate may be formed with a disk shape. In some embodiments, the inclined grate member may be configured to releasably couple to the grate. In some embodiments, the ignition assembly may also include at least one second inclined grate member configured to be supported by the grate, each of the at least one second inclined grate members defining a second plurality of support members extending out of the plane of the grate in an upward direction toward the second chamber so as to support thereon, at an elevation above the plane of the grate, charcoal that is supplied into the second chamber via the fourth end. In some embodiments, the at least one second inclined grate member may include a second inclined grate member and a third inclined grate member. In some embodiments, the first longitudinal axis may be aligned with the second longitudinal axis.

In another exemplary aspect, an ignition assembly includes a lower canister comprising a first wall extending longitudinally along a first longitudinal axis and between a first end and a second end to define a first chamber, an upper canister comprising a second wall extending longitudinally along a second longitudinal axis and between a third end and a fourth end to define a second chamber, wherein when the third end releasably engages the second end, the first longitudinal axis is parallel to the second longitudinal axis, a grate configured to support a quantity of charcoal thereon when supported by the first wall in a plane orthogonal to the first longitudinal axis, and, an inclined grate member supported by the grate and defining a plurality of support members extending out of the plane of the grate in an upward direction toward the second chamber so as to support thereon, at an elevation above the plane of the grate, charcoal that is supplied into the second chamber via the fourth end, wherein the upper canister is configured to be removed from the lower canister such that, upon said removal, the charcoal supplied into the second chamber remains substantially supported by the grate and the inclined grate member.

In some embodiments, the inclined grate member may be formed with a conical shape. In some embodiments, the inclined grate member may be integrally formed with the grate as a unitary body. In some embodiments, the grate comprises may be formed with a disk shape. In some embodiments, the first longitudinal axis may be aligned with the second longitudinal axis.

In another exemplary aspect, an ignition assembly includes a lower canister comprising a first wall extending longitudinally along a first longitudinal axis and between a first end and a second end to define a first chamber, an upper canister comprising a second wall extending longitudinally along a second longitudinal axis and between a third end and a fourth end to define a second chamber, wherein when the third end releasably engages the second end, the first longitudinal axis is parallel to the second longitudinal axis, a grate configured to support a quantity of charcoal thereon when supported by the first wall in a plane orthogonal to the first longitudinal axis, and, means for improving the contact surface between the charcoal and air flow, which means are supported by the grate, wherein the upper canister is configured to be removed from the lower canister such that, upon said removal, the charcoal supplied into the second chamber remains substantially supported by the grate and said means.

In some embodiments, the means for improving the contact surface between the charcoal and air flow may include a conical-shape grate. In some embodiments, the means for improving the contact surface between the charcoal and air flow may be integrally formed with the grate as a unitary body. In some embodiments, the grate comprises may be formed with a disk shape. In some embodiments, the first longitudinal axis may be aligned with the second longitudinal axis.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components.

What is claimed is:

1. An ignition assembly, comprising:
   a lower canister comprising a first wall extending longitudinally along a first longitudinal axis and between a first end and a second end to define a first chamber;
   an upper canister comprising a second wall extending longitudinally along a second longitudinal axis and between a third end and a fourth end to define a second chamber, wherein when the third end releasably engages the second end, the first longitudinal axis is parallel to the second longitudinal axis;
   a grate, supported by the first wall in a plane orthogonal to the first longitudinal axis such that the grate separates the upper canister from the lower canister, configured to support a quantity of charcoal that is supplied into the second chamber via the fourth end; and,
   a cone extending upwards from the grate into the upper canister when the upper canister is disposed on the grate,
   wherein the upper canister is configured to be removed from the lower canister such that, upon said removal, the charcoal supplied into the second chamber is distributed radially away from the second longitudinal axis by the cone and remains substantially supported by the grate.

2. The ignition assembly of claim 1, further comprising: an inclined grate member configured to be supported by the grate to support at least a portion of the quantity of charcoal, the inclined grate member defining a plurality of support members extending out of the plane of the grate in an upward direction toward the second chamber so as to support thereon, at an elevation above the plane of the grate, charcoal that is supplied into the second chamber via the fourth end.

3. The ignition assembly of claim 2, wherein the inclined grate member is integrally formed with the grate as a unitary body.

4. The ignition assembly of claim 2, wherein the inclined grate member is formed with a conical shape.

5. The ignition assembly of claim 2, wherein the grate is formed with a disk shape.

6. The ignition assembly of claim 2, wherein the inclined grate member is configured to releasably couple to the grate.

7. The ignition assembly of claim 6 further comprising: at least one second inclined grate member configured to be supported by the grate, each of the at least one second inclined grate members defining a second plurality of support members extending out of the plane of the grate in an upward direction toward the second chamber so as to support thereon, at an elevation above the plane of the grate, charcoal that is supplied into the second chamber via the fourth end.

8. The ignition assembly of claim 7, wherein the at least one second inclined grate member comprises a second inclined grate member and a third inclined grate member.

9. The ignition assembly of claim 1, wherein the first longitudinal axis is aligned with the second longitudinal axis.

10. The ignition assembly of claim 1, further comprising: a handle releasably coupled to the upper canister.

11. An ignition assembly, the apparatus comprising:
    a lower canister comprising a first wall extending longitudinally along a first longitudinal axis and between a first end and a second end to define a first chamber;
    an upper canister comprising a second wall extending longitudinally along a second longitudinal axis and between a third end and a fourth end to define a second chamber, wherein when the third end releasably engages the second end, the first longitudinal axis is parallel to the second longitudinal axis; and,
    an inclined grate member supported by a grate, the inclined grate member defining a plurality of support members extending out of a plane of the grate in an upward direction toward the second chamber so as to support thereon, at an elevation above the plane of the grate, charcoal that is supplied into the second chamber via the fourth end,
    wherein the grate separates the upper canister and the lower canister, and the upper canister is configured to be removed from the lower canister such that, upon said removal, the charcoal supplied into the second chamber is distributed on the grate away from the second longitudinal axis by the inclined grate member, and the charcoal remains substantially supported by the grate and the inclined grate member.

12. The ignition assembly of claim 11, wherein the inclined grate member is formed with a conical shape.

13. The ignition assembly of claim 11, wherein the inclined grate member is integrally formed with the grate as a unitary body.

14. The ignition assembly of claim 11, wherein the grate is formed with a disk shape.

15. The ignition assembly of claim 11, wherein the first longitudinal axis is aligned with the second longitudinal axis.

16. An ignition assembly, the apparatus comprising:
- a lower canister comprising a first wall extending longitudinally along a first longitudinal axis and between a first end and a second end to define a first chamber;
- an upper canister comprising a second wall extending longitudinally along a second longitudinal axis and between a third end and a fourth end to define a second chamber, wherein when the third end releasably engages the second end, the first longitudinal axis is parallel to the second longitudinal axis;
- a grate separating the lower canister from the upper canister, the grate configured to support a quantity of charcoal thereon when supported by the first wall in a plane orthogonal to the first longitudinal axis; and,
- means for improving a contact surface between the charcoal and air flow, which means are supported by the grate, wherein the upper canister is configured to be removed from the lower canister such that, upon said removal, the charcoal supplied into the second chamber remains substantially supported by the grate and said means distributes the charcoal away from the second longitudinal axis upon removal of the upper canister.

17. The ignition assembly of claim 16, wherein the means for improving the contact surface between the charcoal and air flow comprise a conical-shape grate.

18. The ignition assembly of claim 16, wherein the means for improving the contact surface between the charcoal and air flow is integrally formed with the grate as a unitary body.

19. The ignition assembly of claim 16, wherein the grate is formed with a disk shape.

20. The ignition assembly of claim 16, wherein the first longitudinal axis is aligned with the second longitudinal axis.

* * * * *